(12) United States Patent
Kelso

(10) Patent No.: US 10,717,388 B2
(45) Date of Patent: Jul. 21, 2020

(54) INFLATOR WITH REFLECTIVE HOUSING

(71) Applicant: ILLINOIS TOOL WORKS INC., Glenview, IL (US)

(72) Inventor: Brendan P. Kelso, Atascadero, CA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 177 days.

(21) Appl. No.: 15/872,704

(22) Filed: Jan. 16, 2018

(65) Prior Publication Data

US 2018/0201186 A1 Jul. 19, 2018

Related U.S. Application Data

(60) Provisional application No. 62/446,740, filed on Jan. 16, 2017.

(51) Int. Cl.
| | | |
|---|---|---|
| *G02B 5/12* | (2006.01) | |
| *B60Q 7/00* | (2006.01) | |
| *G02B 1/04* | (2006.01) | |
| *B60S 5/04* | (2006.01) | |
| *G02B 5/08* | (2006.01) | |

(52) U.S. Cl.
CPC .............. *B60Q 7/005* (2013.01); *B60S 5/043* (2013.01); *G02B 1/04* (2013.01); *G02B 5/08* (2013.01)

(58) Field of Classification Search
USPC ....... 359/516, 524, 530, 534, 538, 540, 543, 359/553; 320/104, 105; 439/500; 441/90; 141/1, 38, 83, 95, 98; 362/190, 362/191, 253
See application file for complete search history.

(56) References Cited

U.S. PATENT DOCUMENTS

| | | | | |
|---|---|---|---|---|
| 6,636,015 | B1 * | 10/2003 | Levine | ................ H01M 2/1072 320/104 |
| 2008/0013197 | A1 * | 1/2008 | Heckel, II | ............... E01F 9/619 359/839 |
| 2008/0291539 | A1 * | 11/2008 | Moore | ................... G02B 5/124 359/549 |

* cited by examiner

*Primary Examiner* — Mustak Choudhury
(74) *Attorney, Agent, or Firm* — Pauley Erickson & Kottis

(57) ABSTRACT

A portable inflator includes a housing having or including a compressor. The housing may also contain or include a handle and stand. The housing has an outer surface at least in part formed or constructed of a light reflective material. Suitable light reflective materials can include reflective plastic materials or the like.

11 Claims, 1 Drawing Sheet

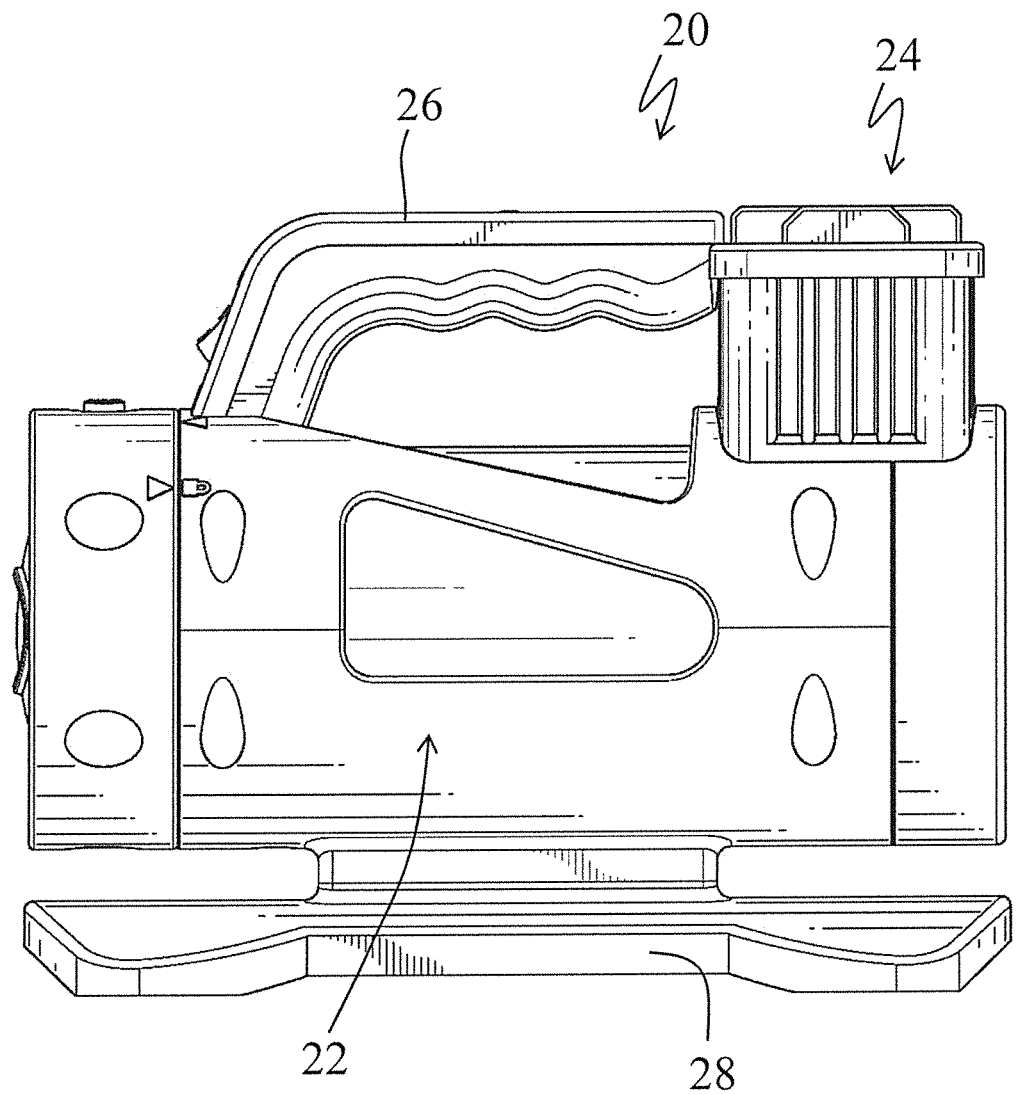

INFLATOR WITH REFLECTIVE HOUSING

CROSS REFERENCE TO RELATED APPLICATIONS

This application claims the benefit of U.S. Provisional Patent Application, Ser. No. 62/446,740, filed on 16 Jan. 2017. The Provisional Application is hereby incorporated by reference herein in its entirety and is made a part hereof, including but not limited to those portions which specifically appear hereinafter.

BACKGROUND OF THE INVENTION

Field of the Invention

This invention relates generally to inflators and, more specifically, to inflators particularly adapted for use under conditions of reduced visibility, such as in a sporadic light environment.

Description of Prior Art

Inflators are often carried in vehicles and used to produce or provide a portable source of inflation gas such as for vehicle tire inflation under emergency or other circumstances wherein a stationary source of inflation gas is unavailable or inaccessible.

Additionally, inflators are often used in camping and the like or similar recreational applications such as for inflating rafts, tires and other inflatable devices. Inflators typically include a compressor, a hose and/or a gauge for inflating the device to a desired pressure.

Inflators can find critical use or application under conditions of reduced visibility including, for example, at nighttime such as for emergency roadside vehicle tire inflation.

As will be appreciated, under such conditions of reduced visibility, user safety can be of increased concern such that the presence or inclusion of features for improved or increased visibility may be desirable.

SUMMARY OF THE INVENTION

The present invention is directed to an inflator such as particularly suited for use in or use under conditions of reduced visibility, in a sporadic light environment.

In accordance with one aspect of the invention, there is provided a portable inflator comprising a housing including a compressor. The housing is desirably formed, constructed or otherwise includes an outer surface at least in part formed or constructed of a light reflective material.

BRIEF DESCRIPTION OF THE DRAWINGS

The above-mentioned and other features and objects of this invention will be better understood from the following detailed description taken in conjunction with the drawings wherein the FIGURE is a side view of an inflator device in accordance with one embodiment of this invention.

DESCRIPTION OF PREFERRED EMBODIMENTS

The FIGURE shows an inflator 20 according to one embodiment of this invention. The inflator 20 desirably includes a housing 22 such as having or including a compressor 24, a handle 26, a stand 28 and a hose and/or hose attachment (not shown) for inflating a selected inflatable object.

While features such as the handle and/or stand can be integrally formed in a one-piece construction of the housing, it will be appreciated by those skilled in the art and guided by the teachings herein provided that, if desired, such features can be formed as separate components such as secured or otherwise appropriately connected or joined to or with the housing, as may be desired for particular applications.

As detailed below, the housing 22 is at least in part formed, constructed or otherwise desirably includes an outer surface of or including a suitable light reflective material or the like. This is in contrast to typical or common portable inflator devices that commonly have a housing formed of black or otherwise non-reflective material.

While the broader practice of the invention is not necessarily limited to use with or in the inflation of specific inflatable objects, the invention is believed to have particular applicability for use in conjunction with the inflation of objects such as vehicle tires such as in emergency roadside or similar circumstances. In such applications, the presence of a reflective inflator device can act or serve to provide increased safety to the user by making the presence of the inflator and the associated user more apparent such under at least certain conditions of reduced visibility. For example, under such conditions of reduced visibility such as due to reduced lighting such as due to fog or nighttime conditions, the presence of a subject reflective inflator device can act or serve to make the presence of the inflator and the associated user more apparent such as to a motorist in a passing vehicle whose lights may be appropriately reflected by or off of the reflective inflator device housing. In such an application, the reflective material can serve to reflect light, such as sporadically provided by headlights of passing motor vehicles.

As will be appreciated, a wide a variety of reflective materials are available for use in the construction of reflective inflator device housings in accordance with the invention and thus the broader practice of the invention is not limited by or to housings formed or made with a specific or particular reflective material.

In accordance with certain preferred embodiments, inflator device housings are formed, constructed or otherwise desirably include or incorporate a reflective plastic material, such as known and such as may be available, used and/or incorporated, without any unnecessary limitation, in a variety of colors, shades or hues.

As will be appreciated by those skilled in the art and guided by the teachings herein provided, certain colors, shade or hues may be desired for particular applications. For example, for certain applications a reflective material of a color or hue that sharply contrasts with typical or normally surrounding or ambient colors or hues may be desired or preferred. For example, yellow, orange, red or the like color or hue may be particularly desired in or for an inflator designed for a roadside application (such as where grey or other muted colors may predominate) or a camping application (such as where greens and browns or other earth tones may predominate).

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. A portable inflator comprising a housing including a compressor, the housing of one-piece plastic construction and formed of a light reflective plastic material, wherein the light reflective plastic material is adapted for use under conditions of reduced visibility and is of a selected color or hue to contrast with the surrounding or ambient colors or hues.

2. The portable inflator of claim 1 wherein the light reflective material is of yellow color.

3. The portable inflator of claim 1 wherein the light reflective material is of orange color.

4. The portable inflator of claim 1 wherein the light reflective material is of red color.

5. The portable inflator of claim 1 wherein an outer surface of the compressor is at least in part formed or constructed of the light reflective material.

6. The portable inflator of claim 1 wherein the housing additionally comprises a handle.

7. The portable inflator of claim 1 wherein the housing additionally comprises a stand.

8. The portable inflator of claim 1 wherein the light reflective material forming the housing of one-piece construction is of a color or hue selected from the group consisting of yellow, orange or red.

9. A portable inflator comprising a housing including a compressor, a handle and a stand, the housing being a one piece plastic construction of a light reflective plastic material, wherein the light reflective plastic material is adapted for use under conditions of reduced visibility and is of a selected color or hue to contrast with the surrounding or ambient colors or hues.

10. The portable inflator of claim 9 wherein the light reflective plastic material housing of one-piece construction is of a color or hue selected from the group consisting of yellow, orange and red.

11. A portable inflator comprising a housing of one-piece plastic construction including a handle and a stand, the housing further including a compressor, the one-piece housing constructed of a light reflective plastic material, wherein the light reflective plastic material is adapted for use under conditions of reduced visibility and is of a selected color or hue to contrast with the surrounding or ambient colors or hues, and wherein the light reflective plastic material having a color or hue selected from the group consisting of yellow, orange and red.

* * * * *